United States Patent
Birkenhauer

(10) Patent No.: US 10,067,749 B2
(45) Date of Patent: Sep. 4, 2018

(54) GENERATING CONSUMER-ORIENTED APIS FROM A UI MODEL

(71) Applicant: SAP SE, Walldorf (DE)

(72) Inventor: Christoph Birkenhauer, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 918 days.

(21) Appl. No.: 14/522,617

(22) Filed: Oct. 24, 2014

(65) Prior Publication Data
US 2016/0117151 A1    Apr. 28, 2016

(51) Int. Cl.
   *G06F 9/44*    (2018.01)
   *G06F 8/35*    (2018.01)
   *G06F 8/38*    (2018.01)
   *G06F 8/36*    (2018.01)

(52) U.S. Cl.
   CPC ............. *G06F 8/35* (2013.01); *G06F 8/38* (2013.01); *G06F 8/36* (2013.01)

(58) Field of Classification Search
   CPC ................ G06F 8/35; G06F 8/38; G06F 8/36
   See application file for complete search history.

(56) References Cited

U.S. PATENT DOCUMENTS

| | | | | |
|---|---|---|---|---|
| 2005/0246205 A1* | 11/2005 | Wang | ............... | G06Q 50/24 705/3 |
| 2006/0053120 A1* | 3/2006 | Shum | ............... | G06Q 30/02 |
| 2008/0243993 A1* | 10/2008 | Wang | ............... | H04L 29/12113 709/203 |
| 2011/0099502 A1* | 4/2011 | Kim | ............... | G06F 17/30864 715/771 |
| 2011/0191383 A1* | 8/2011 | Addala | ............... | G06F 17/30 707/797 |
| 2014/0229910 A1* | 8/2014 | Frenkiel | ............... | G06F 8/51 717/104 |
| 2015/0161235 A1* | 6/2015 | Libfeld | ............... | G06F 17/3056 707/607 |
| 2016/0057196 A1* | 2/2016 | Bentley | ............... | G06F 3/04842 715/738 |
| 2016/0078388 A1* | 3/2016 | Himmelreich | ............... | G06F 11/34 709/224 |

\* cited by examiner

*Primary Examiner* — Viva Miller
(74) *Attorney, Agent, or Firm* — Buckley, Maschoff & Talwalkar LLC

(57) ABSTRACT

Various embodiments of systems and methods to generate consumer-oriented APIs from a UI model are described herein. In one aspect, a unique identifier is assigned to a node, and corresponding elements and actions of an ADM. The elements and actions associated with the node are mapped to one or more UI elements of an application UI using the assigned unique identifier. A service definition is derived from the UI elements and the UI actions by interacting with the application UI. Further, an API is generated based on the service definition. The generated API is independent from the application UI.

20 Claims, 6 Drawing Sheets

GENERATING CONSUMER-ORIENTED APIS FROM A UI MODEL

BACKGROUND

Capturing information from a source and delivering the captured information in a specific format to a destination plays an important role in business operations. Consumers may desire to export/import data from/to an application in a custom format via machine-to-machine communication. In this regard, methods use user interfaces (UIs) as machine-readable interfaces to read/write data from/into databases, which is based on a consumer-side UI technology. When a UI layout changes, a consumer system needs to be updated accordingly even if business semantics stays the same. Also, when a UI technology changes, a consumer system may need to be completely re-implemented. Further, when a machine reads or writes data via UIs, data is accessed through the UIs as well, which can be slow. For instance, a UI has special requirements with respect to interaction (e.g., dynamic retrieval of value, asynchronous data access, and so on). This may not be necessary for machine-orientated application program interfaces (APIs).

Other methods may use specific models (e.g., public solution model) independent from the UIs for allowing machine access to data. However, these methods are intended for skilled developers and may need thorough training. Further, model's entities may not be related to UI elements or fields of the UI, and may use different terminology, which makes it hard for the developer to decide which field of the model corresponds to which field of the UI.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to generate consumer-oriented application programming interfaces (APIs) from a user interface (UI) model are described herein. The API specifies a set of functions allowing interaction with a business application. These consumer-orientated APIs are intended and optimized for machine-to-machine communication, whereas a UI is intended and optimized for human-machine interaction. The generated APIs are independent from the client-side UI technology and do not make use of the runtime UI stack. According to one embodiment, the APIs are generated based on how an end-user interacts with a computer program via the UI and how the computing system responds. For the API generation, an easy-to-use authoring UI is proposed that resides next to the computer program's end-user UI. The behavior of the computer program is exposed by the UI which follows "model-view-controller" (MVC) approach. The role of the "model" part is taken by an abstract data model (ADM). The ADM is independent from the exact UI technology. It may serve multiple UI definitions or a specific UI definition. The ADM describes the data that is available for display or manipulation via the UI. It does not only describe the data, but also defines the possible actions on the data. For example, "CRUD" actions (create, read, update, delete) are available by default. Any relational data model that also models actions can serve as the ADM, as long as certain constraints are met, which are described in later sections.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
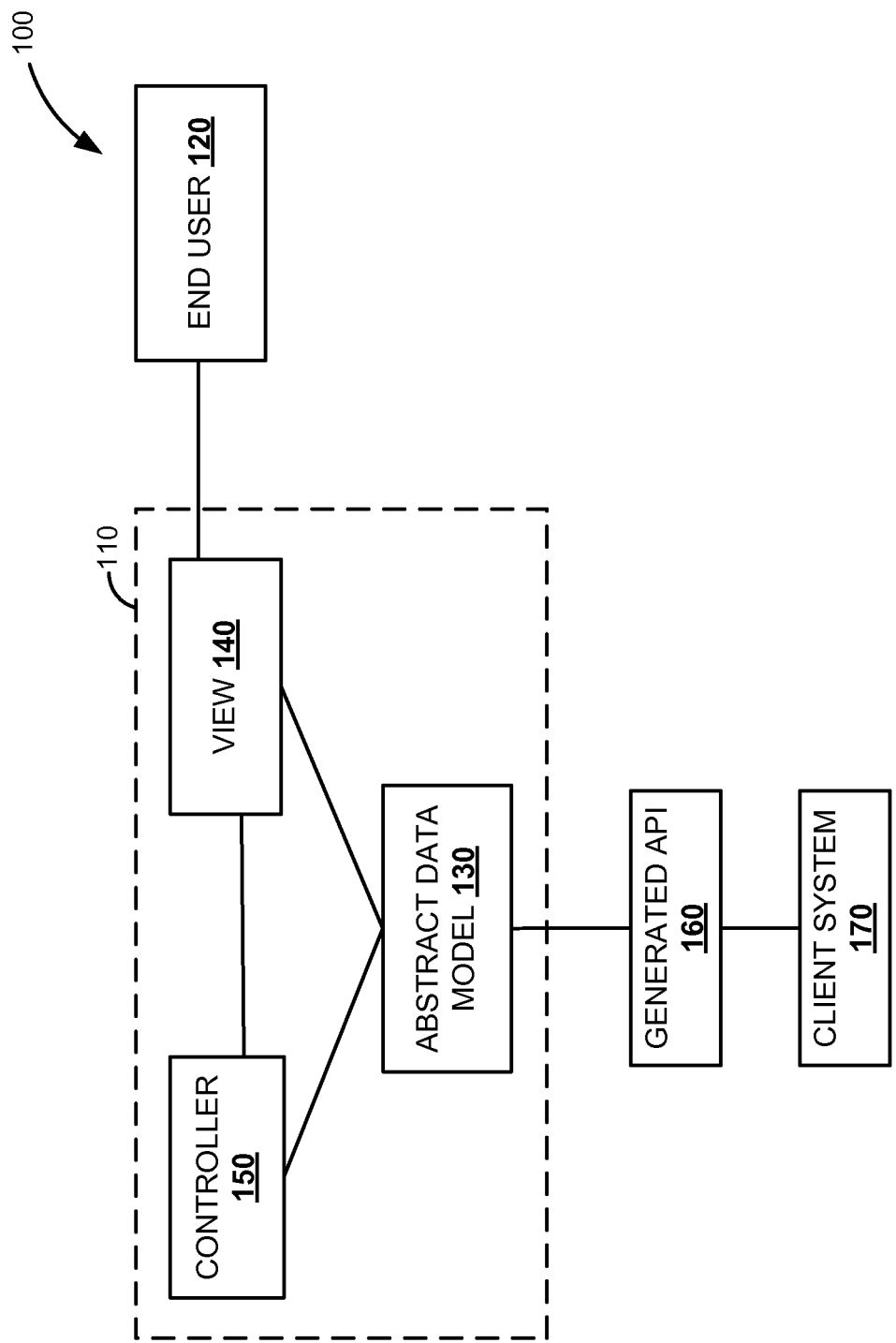
FIG. 1 is a block diagram illustrating, at a high-level, a system, according to an embodiment.

FIG. 1 is a block diagram illustrating, at a high-level, system 100, according to an embodiment. Model-View-Controller (MVC) 110 includes abstract data model (ADM) 130, a presentation logic (e.g., view 140), and a program control (e.g., controller 150) to separate internal representations of data from the ways that the data is presented to or accepted from end-user 120. The end-user 120 accesses the computer program associated with a business application via the view 140.

The view 140 defines the layout and renders mandatory input fields as well as read only fields in a suitable visual way. The controller 150 processes a user input. The controller 150 controls the flow of data between the view 140 and the ADM 130. The ADM 130 describes the data that is available for display or manipulation. It does not only describe the data, but also defines the possible actions on the data. Further, client system 170 accesses the ADM 130 via generated API 160, independently from the view 140 and the controller 150.

In an example framework, business applications are modeled using business objects. A business object is an abstraction of items in an information domain that are capable of independent existence or can be uniquely identified. Further, the business object includes a set of instance variables or properties, also known as attributes, and associations with other business objects, weaving a map of business objects representing business relationships. For example, the business object includes business data or transactional data or application data produced during the course of business activities taken place in an enterprise. The business object may include, but are not limited to, employee details of an enterprise, sales data generated by sales groups, production figures from manufacturing groups, and purchase orders of raw materials used for manufacturing, travel expenses, marketing and advertising costs. The ADM 130 can be defined as a set of business object nodes which have properties, compositions, associations, and actions. Therefore, the ADM 130 includes application data, business rules, logic and functions. The ADM 130 is defined for retrieving data as well as for integrating business logic. In one embodiment, an application programming interface (API) is generated that uses the ADM 130 to access the business objects.

Figure 2:
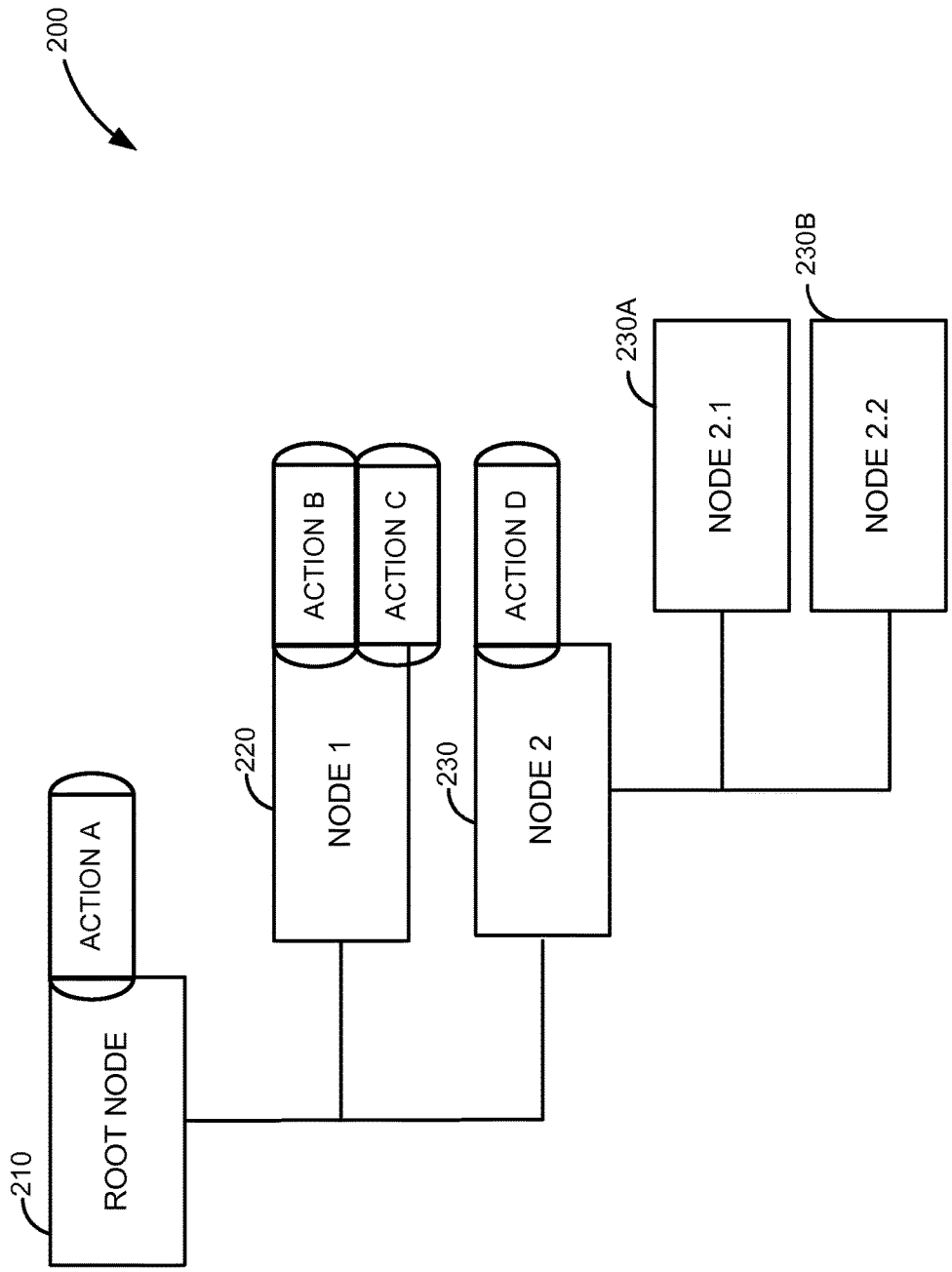
FIG. 2 is a schematic diagram of an abstract data model (ADM), according to an embodiment.

FIG. 2 is a schematic diagram of ADM 200, for example, the ADM 130 of FIG. 1, according to an embodiment. The ADM 200 is a tree-like structure (that is hierarchical structure) composed of a number of nodes. The number of nodes includes a root node 210 and optionally one or more sub-nodes or child nodes (e.g., 220 and 230), and a child node (e.g., 230) may include one or more grand-child nodes (e.g., 230A and 230B), and so on. A node may include an arbitrary number of elements that carry the actual business data associated with the business object. Further, the nodes are related to each other with cardinality (e.g., 1-n cardinality) and optionally different nodes may have same cardinality. For instance, there may be a node below the root node 210 with a 1:1 relation to the root node 210. Such nodes may be introduced for semantic grouping of elements. In one embodiment, the structure of how data is presented in a view (e.g., view 140 in FIG. 1), that is the exact grouping of data in tabs or frames, is not reflected in the ADM 200 in order to allow for redesigning of the view, but keeping the ADM 200 unchanged.

Further, the ADM 200 includes actions (e.g., ACTION A to ACTION D) that are associated with relevant nodes (e.g., 210, 220, 230, 230A and 230B). Examples of the actions include, but are not limited to, "create" action, "read" action, "update" action and/or "delete" action (i.e., CRUD actions). An action on the root node 210 may have impact on the business objects associated with the ADM 200, while an action on the sub-nodes (e.g., 220 and 230) may have impact on the sub-nodes (e.g., 220 and 230) and sub-nodes (e.g., 230A and 230B) of the sub-nodes (e.g., 230) and so forth.

In one exemplary implementation, a node of the ADM 200 may be associated with one or more nodes from different ADMs. The associations between ADM nodes depend on modeled relationship (e.g., using primary key and foreign key relationships) such that associated data can be retrieved automatically. The relationships between the nodes of different ADMs are determined by matching a primary key in one of the node associated with an ADM with a foreign key in the other node associated with other ADM, for instance. Further, the nodes of the ADM 200 are bound to the UI elements and are managed by a controller (e.g., the controller 150 of FIG. 1).

In one embodiment, the ADM 200 describes the data that is available for display or manipulation via the UI. The nodes of the ADM 200 are assigned with a unique identifier each, which does not change over the lifetime of the computer program associated with the business application. Thereby, the ADM 200 is maintained stable. Also, the ADM 200 is independent from the UI technology of the view. If a new UI technology is supported by a new version of the computer program, the view may be enhanced, but the ADM 200 may not change. Further, the nodes and actions of the ADM 200 are associated with generated APIs. The APIs are defined by a user using an authoring UI, which resides next to the business application's end-user UI (e.g., at the end user 120 of FIG. 1).

Figure 3:
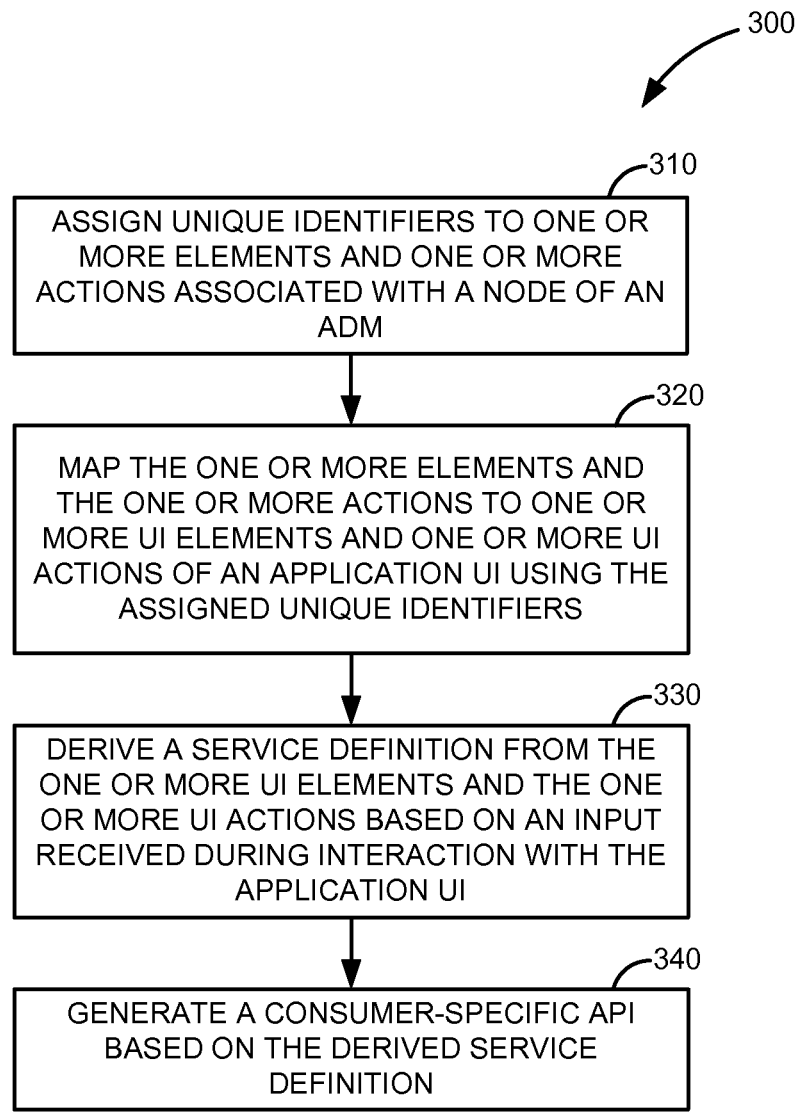
FIG. 3 is a flow diagram illustrating a process to generate consumer oriented APIs from a UI model, according to an embodiment.

FIG. 3 is a flow diagram illustrating process 300 to generate consumer oriented APIs from a UI model, according to an embodiment. In one aspect, stability of the data model is maintained. Thereby the generated consumer-orientated APIs are usable after a software update or a software upgrade. In this regard, an ADM changes in such a way that a consumer need not react. For instance, any change compatible with a previous version of the ADM such as adding new optional elements or new optional nodes can be allowed. Incompatible changes are allowed if they are a consequence of the corresponding business requirements (for instance a legal change requires a new mandatory field). In such a scenario, corresponding consumer adapts in order to fulfill the new legal requirement. Further, it is noted that the consumer-orientated service is generated based on the UI model. The "semantic model" of the UI will only change incompatibly if there is a business need. Such changes are acceptable. However, redesign of some underlying, non-public implementation will not reflect in the UI. Correspondingly it will not reflect in the generated service either.

At 310, at design time, unique identifiers are assigned to one or more elements and one or more actions associated with a node (e.g., nodes 210, 220, 230, 230A and 230B of FIG. 2) of the ADM. Also, the nodes (e.g., nodes 210, 220, 230, 230A and 230B of FIG. 2) are assigned with the unique identifiers. The unique identifiers are reference numbers used as permanent identifier of the node and in turn the corresponding business object node. Further, the unique identifiers do not change over the lifetime of the computer program. Thus, the node or an element of the node can be identified across different patches or releases, even if the name or label of the node or the element is changed.

In one exemplary embodiment, across different patches or releases, the properties of the nodes and the elements that are associated with the unique identifiers (e.g., data types) are checked for compatibility before accepting the change in the ADM. Compatible changes are allowed. Incompatible changes trigger an approval process which provides relevant information of the change in the ADM. Only incompatible changes due to business requirements will be accepted. Such changes are communicated to the users of the generated API such that they can adapt the change in order to fulfill the new business requirement.

At 320, the elements and the associated actions of the node are mapped to one or more user interface (UI) elements and associated one or more UI actions of an application UI (e.g., view 140 of FIG. 1) using the assigned unique identifiers. In one embodiment, a UI model binds ADM node elements to application UI fields as well as ADM actions to the application UI actions. The UI model is a representation of how the consumer interacts with a computer program or another device and also how the system responds, which is described in greater detail in FIG. 4.

Figure 4:
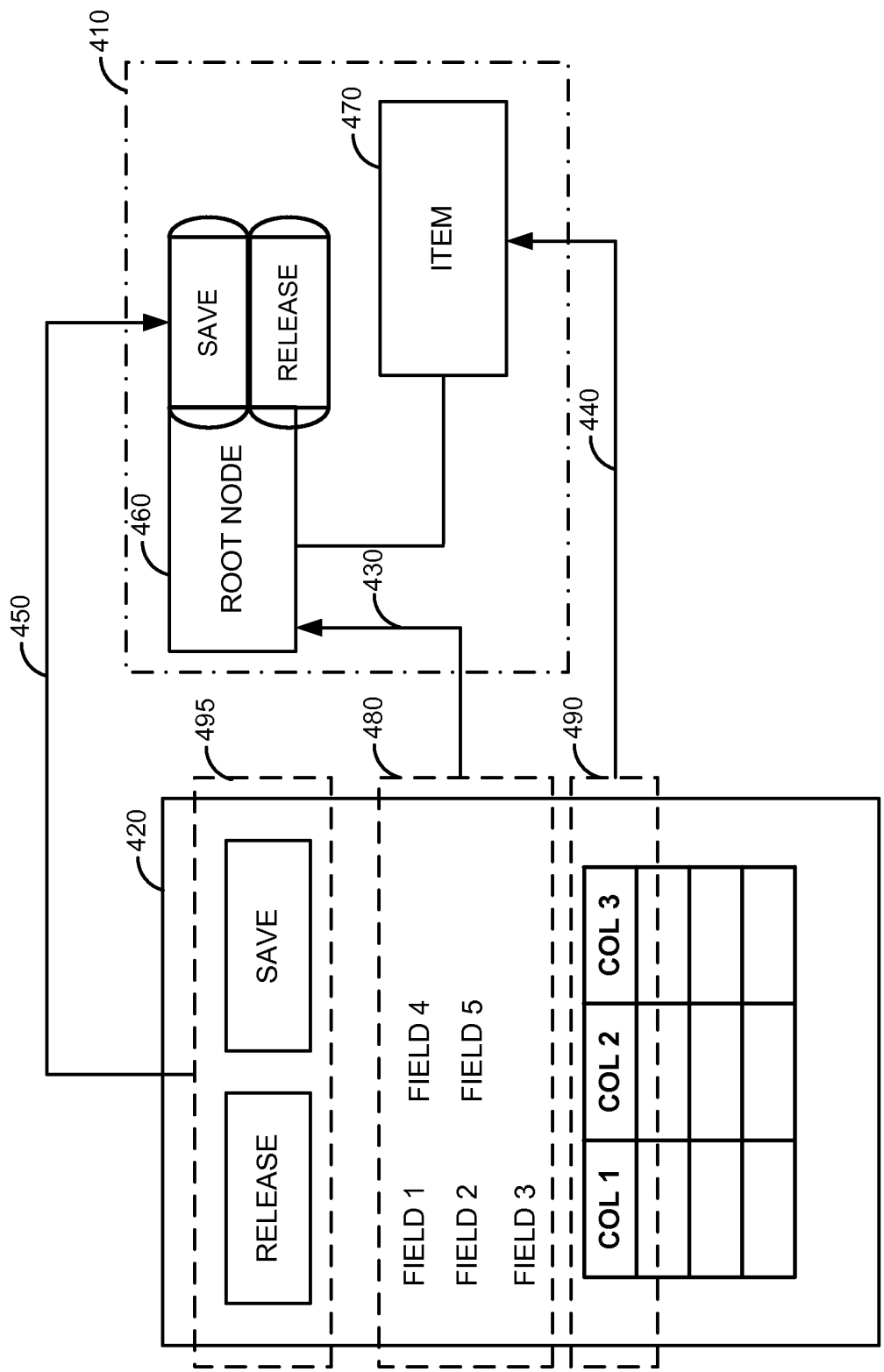
FIG. 4 is a block diagram illustrating an ADM mapped to an application UI, according to an embodiment.

FIG. 4 is a block diagram illustrating ADM 410 mapped to application UI 420, according to an embodiment. At design time, the application UI 420 is modeled using the ADM 410. Arrows (e.g., 430, 440 and 450) represent the mapping process using a mapping engine. FIG. 4 shows a simple example for the binding of ADM nodes (e.g., root node 460 and sub-node 'item' 470) and actions (e.g., save and release corresponding to the root node 460) to the UI elements of application UI 420. The UI elements such as input/output fields (e.g., 480 and 490) are mapped (e.g., arrows 430 and 440) to nodes (e.g., 460 and 470) of the ADM and UI actions (e.g., "release" and "save", 495) are mapped (e.g., arrow 450) to ADM actions of the relevant node (e.g., 460). In the example, the root node 460 includes five elements that are bound to the UI fields 1 to 5 (e.g., 480) and the item node 470 includes three elements that are bound to UI columns 1 to 3 (e.g., 490). Since the ADM 410 is stable, the fields and the actions that are exposed to the consumer via the generated API remain stable even when the UI fields and actions are rendered in a new style and with a new UI technology.

At 330 of FIG. 3, a service definition is derived from the one or more UI elements and the one or more UI actions based on an input received during interaction with the application UI (i.e., by interacting with the application UI). For instance, the end user enters data into input UI fields and clicks buttons. Further, the end user defines properties of the service that may not be derived from the interaction with the application UI.

In one embodiment, the service definition is derived at the application UI to generate a service for accepting given input parameters and to return a desired output. In other words, the application UI is provided an option to define the service definition. One portion of the application UI includes a service authoring environment (e.g., service definition panel) into which the UI elements can be dragged and dropped, for instance, to derive the service definitions. The service definition may include, but is not limited to, input and output parameters, input and output conversion, single processing and set processing, read-only service and update service, actions, navigation, and format and channel. Further, the end-user clicks buttons in order to define the actions which are to be executed by the service. These actions are recorded in the service definition. Besides the user-defined input and output parameters, an output parameter with a list of one or more success or error messages is added by the authoring environment. The list of messages is included generically in every service and may not be changed by the user.

In one exemplary embodiment, the service definition functionality exposed by the authoring UI is plugged into a standard UI processor such that it knows when an action is performed. In the same way the service definition is created for the first time, it can also be maintained and changed afterwards via the application UI. When clicking on a parameter or action of the service definition, the corresponding UI element or the UI action is highlighted. The service definition relies on the stable ADM. When the UI technology changes in a new release the service definition can still be visualized in the application UI. The customer-defined service definitions need not be changed to adapt to the new UI technology.

Further, depending on the type of service, (such as data creation service or data update service) certain constraints can be directly derived from the UI model as part of the service definition. For example, for data creation services, mandatory application UI elements are automatically included as input parameters in the service definition. For data update services, display-only UI elements may not be input parameters, but may be added as output parameters. Furthermore, parameter names are defaulted from the label of the corresponding UI element. However, the consumer can change parameter names. The service parameters are bound against the technical IDs of the underlying ADM fields. Therefore it is possible to define the parameter names.

The end user can define how the service should handle input and output conversion. For some UI fields a different value is displayed than is maintained in the database. For example, the display of the UI fields such as "Date" (a date requires language- and country-specific conversion, for instance 23.12.2012 in Germany and 23 Dec. 2012 in Great Britain), "Time" (e.g., time-zone dependent display, but time-zone independent storage in Coordinated Universal Time (UTC) format in the database), "Code values" (tax code value 001 is displayed as "VAT" in English or "Mwst." in German), "IDs" (customer number 12345 is displayed as "12345-SAP SE, Walldorf") may differ from the values stored in corresponding backend database. Input/output conversion is typically language and country dependent. In case of date/time UI fields, it is also time-zone dependent. The defined service can deal with input and output conversion in the same way as the UI can deal with it.

In on embodiment, the end user can define a type of representation that is to be used for an input or output parameter: (1) Internal (that is not converted) representation, (2) External (that is converted) representation, (3) Both internal and external representation in case of output parameters (two output parameters per given field). When the external representation is to be used, language, country, and time zone are added to the input parameters if needed by the conversion. In one exemplary embodiment, the input/output conversion parameters may optionally be defaulted, for instance from consumer-specific settings.

The service definition may include consumer-side validations and transformations. For rich-client UIs, the UI client may perform validations and transformations in order to avoid roundtrips to the backend. Such validations can be part of the ADM. In other words, the client-side validations are redundant validations in order to speed up response time on the client. If they were not redundant, the UI model had to provide such client-side validations also in a format that could be executed in the backend. This is not a trivial requirement as the programming language for the UI client might be different from the programming language of the backend. HTML5 UIs use JavaScript, while SAP business applications use Advanced Business Application Programming (ABAP) in the backend.

In one embodiment, the service definition includes whether a service processes one business object (e.g., single processing) or multiple business objects (e.g., set processing). This is inferred from the application UI from which the service definition is derived. For example, when the consumer defines the service from an "object instance floorplan" (OIF), a design template that dictates the structure and behavior of a UI for processing a business object instance of the business object, a corresponding primary key of the business object instance is used as an input parameter and other application UI elements displayed in the application UI as output parameters. When the consumer defines the service from an "object work list" (OWL), a design template that dictates the structure and behavior of a UI for processing multiple business object instances, parameters corresponding to a query panel of the OWL are defined as input parameters and any OWL element as output parameter. Thereby, by deriving the service from the corresponding application UI, the service invocations can be processed more efficiently.

In one embodiment, the service definition defines the type of service such as a read-only service or an update (e.g., insertion, modification and deletion) service corresponding to the application UI. In one exemplary embodiment, the type of service is defined in a uniform resource locator (URL) of the application UI. The URL indicates a "mode" of the UI such as read-only, creation, or update. If the UI is started in update mode, the actions that are used in the service definition indicate whether data is only to be updated or certain node instances are to be deleted. An update service for instance is defined by including the "save" action from the UI or by including the "release" or "cancel" action. A deletion service is defined by including a "delete" action from the UI into the service definition.

In one embodiment, the service definition includes actions associated with the application UI elements. For example, the action can be a click on a button on the application UI that are associated with an action in the underlying ADM.

When multiple actions are included, the actions will be executed in the service in the same order in which they were added. The action may apply to the whole business object (e.g., root node) or only to some sub-node of the business object.

In one embodiment, the service definition includes navigation path from one UI corresponding to a business object to another UI corresponding to another business object. Prerequisite is that an association exists between these two business objects. The association exist in the ADM. Data from associated ADMs can also be included in the service definition. In case of read access, such an association logically corresponds to a join of the underlying database tables based on a foreign key that defines the association.

In one embodiment, the service definition includes one or more authorization objects that are to be checked when the service is invoked. For example, when the defined service is not used manually via the application UI and is invoked from outside the UI context, the service provides an alternative means of reading data from the application or writing data into the application. Depending on the authorization concept of the application that uses the service, it may be necessary to explicitly define how authorization is to be checked. In addition, a mapping of the input parameters to the parameters of the authorization objects can be defined or constants can be given as authorization object parameters.

At 340, a consumer-specific API is generated based on the derived service definition, where the generated consumer-specific API is independent from the UI model. The consumer-specific API accepts the defined input parameters and returns the defined output parameters. Data that is exchanged via consumer-specific APIs can be in different formats and APIs can be invoked via different communication channels.

In one embodiment, the service definition includes a format and a communication channel to be used by the generated consumer-specific API. The intended format and communication channel are provided by the end user in the service definition. For example, the format can be, but is not limited to, extensible markup language (XML), plain text (e.g., comma separated values (CSV)) and ABAP data structure. The communication channels can be, but are not limited to file-based data exchange via manual import/export, file-based data exchange via automatic import/export from/to some folder, file-based data exchange with built-in document generation tool (e.g., Adobe Document Services), Web-services for electronic data interchange (EDI) such as open data protocol (OData) and Simple Object Access Protocol (SOAP) according to Enterprise Service-Oriented Architecture (SOA), and Remote Function Call (RFC).

In the file-based data exchange via manual import/export, the application UI for which the service is defined gets an additional action "Export as file"/"Import from file" that the consumer can use for manual data exchange. The parameters that cannot be defaulted have to be entered by the consumer. In the file-based data exchange via automatic import/export from/to some folder, the folder is configured in the service definition. Data is exported regularly into the folder or data is imported regularly from the folder (based on some periodic job or only if certain conditions are met in a business event). In RFC, when the service is to be invoked electronically, but not via web-service, a standard remote enabled function module is generated that takes the corresponding input parameters and returns the desired output. RFC can support any type of data format: XML, plain text, or ABAP data structures. Therefore, depending on the format and communication channel, parameters can be derived.

Figure 5:
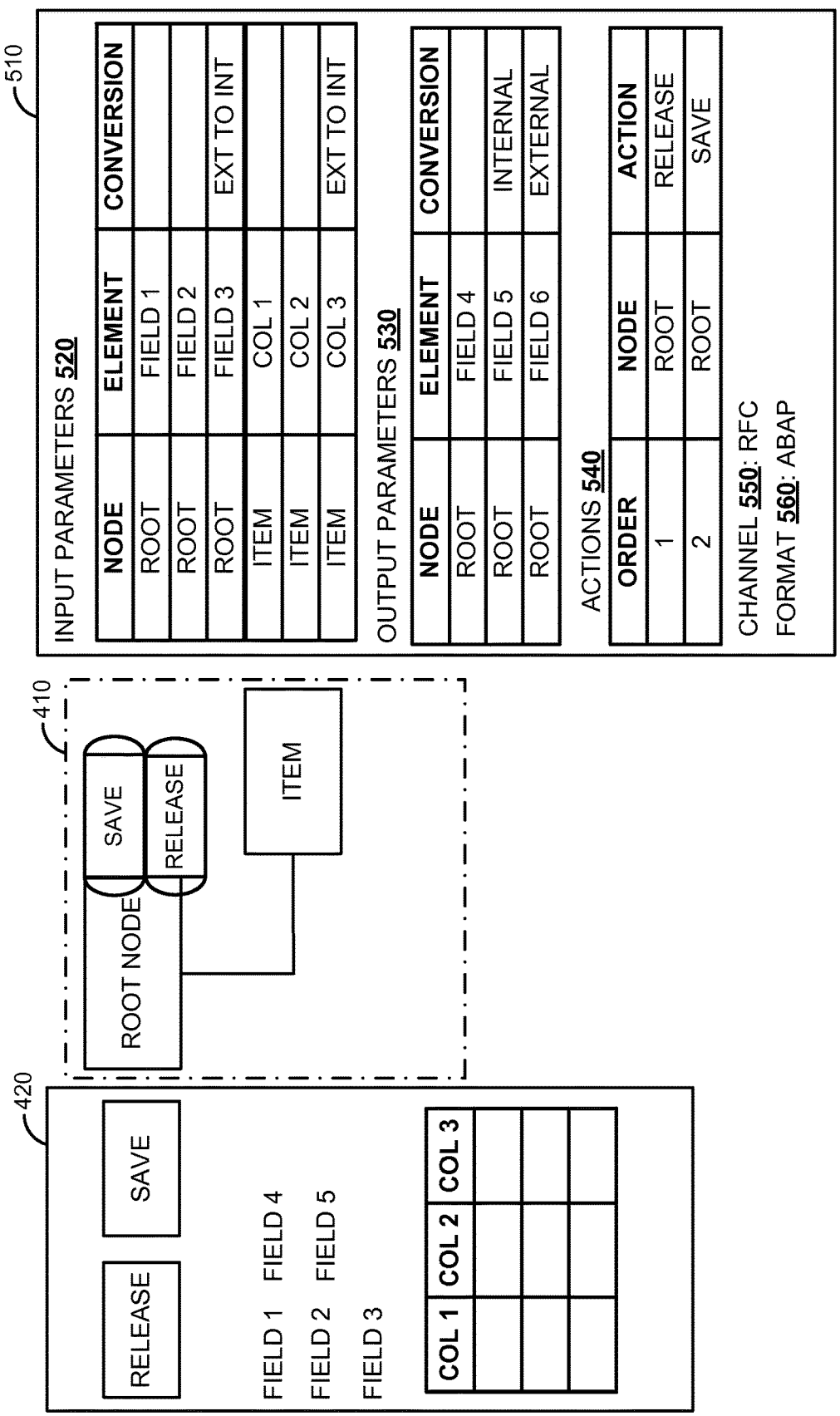
FIG. 5 shows exemplary service definitions associated with an ADM corresponding to an application UI, according to an embodiment.

FIG. 5 shows exemplary service definitions 510 associated with an ADM (e.g., ADM 410 for the application UI 420 of FIG. 4), according to an embodiment. The service definition 510 depicts input parameters 520, output parameters 530, actions 540, channel 550 and format 560. A service implementation may be generated for creating, reading, updating, or deleting ADM nodes. The service implementation can support different interface types. For example, web-service, remote-enabled function module, or "form message data XML" for SAP® Business ByDesign PDF generation. The generated service implementation is called at runtime in order to invoke the service. The service handles input/output conversion if needed and invokes lower-level actions that are defined in the underlying ADM, e.g., 410 based on the serve definition 510.

In one exemplary embodiment, the service implementation for service definition 510 including the input parameters 520 and the output parameters 530 are generated as remote-enabled function module with ABAP data structures. Assuming that the application UI is opened in creation mode, the service generation algorithm is as follows: (1) Algorithm for deriving the input parameters 520:

---

For each referenced ADM node generate one input parameter with corresponding ABAP
data structure:
    For each contained ADM element field:
        Read meta data from underlying ADM element and add corresponding component
           in ABAP data structure
        If input or output conversion required: Add country and language as input
           parameters
        If input or output conversion required for date/time field: Add time zone as input
           parameter

---

(2) Algorithm for generating the output parameters 530:

---

For each referenced ADM node generate one output parameter with corresponding ABAP
data structure:
    For each contained ADM element field:
        Read meta data from underlying ADM element and add corresponding component
           in ABAP data structure If output conversion required: use data type from internal representation or external representation, depending on configuration. If both internal and external representation required: Generate two components in ABAP data structure
Finally add tabular parameter for message handling In one embodiment, the service implementation is generated as function module source code according to format 560. An exemplary service implementation of the generated API based on the ADM 410 is as follows. During runtime, input conversion is applied to FIELD 3, root node instance is created by invoking corresponding core service of the ADM 410. Input conversion is applied to all values of COL 3 of the item input parameter. Item node instances are created via association from root node by invoking corresponding core service of the ADM 410. Further, "release" action of root node in the ADM 410 is invoked. "Save" action of root node in ADM is invoked. Then, derived elements (e.g., FIELDS 4 and 5) of root node instance are read by invoking corresponding ADM core service. Output conversion to FIELD 5 is applied. Output parameter with FIELDS 4 and 5 is filled; one component for internal representation of FIELD 5 and another component for external representation of FIELD 5 are used.

Therefore, the above described method of accessing the business object via the ADM directly generates machine readable APIs in the backend. The end-user can point to data which can then be exported via the application UI in a machine-readable format or accessed by a generated API that does not require any human-machine interaction. There is no need to understand the application's backend data model or its database tables. The application UI is used as source for designing the machine readable APIs (e.g., to derive service definitions), but not for data access at runtime. Thereby, there is no need to learn additional entities like "business objects" or database tables and to figure out how the model relates to the UI model unless a new UI has to be developed for a business object. The ADM can be explored and learned by looking at runtime data via the UI. Also, it is not required to annotate the business objects with respect to what is public and what is not. No need to publish business object's meta data together with lengthy documentation. Also, no need to re-implement data transformations that are due to the differences between UI and the business object.

Thereby, providing the flexibility and ability to define consumer-specific APIs is advantageous since not every type of data consumption and provisioning by the consumers can be supported by an application out of the box. The application may build in some flexibility such that customers or partners can define their own data consumption and provisioning for document-generation purposes.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium.

Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and read only memory (ROM) and random access memory (RAM) devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
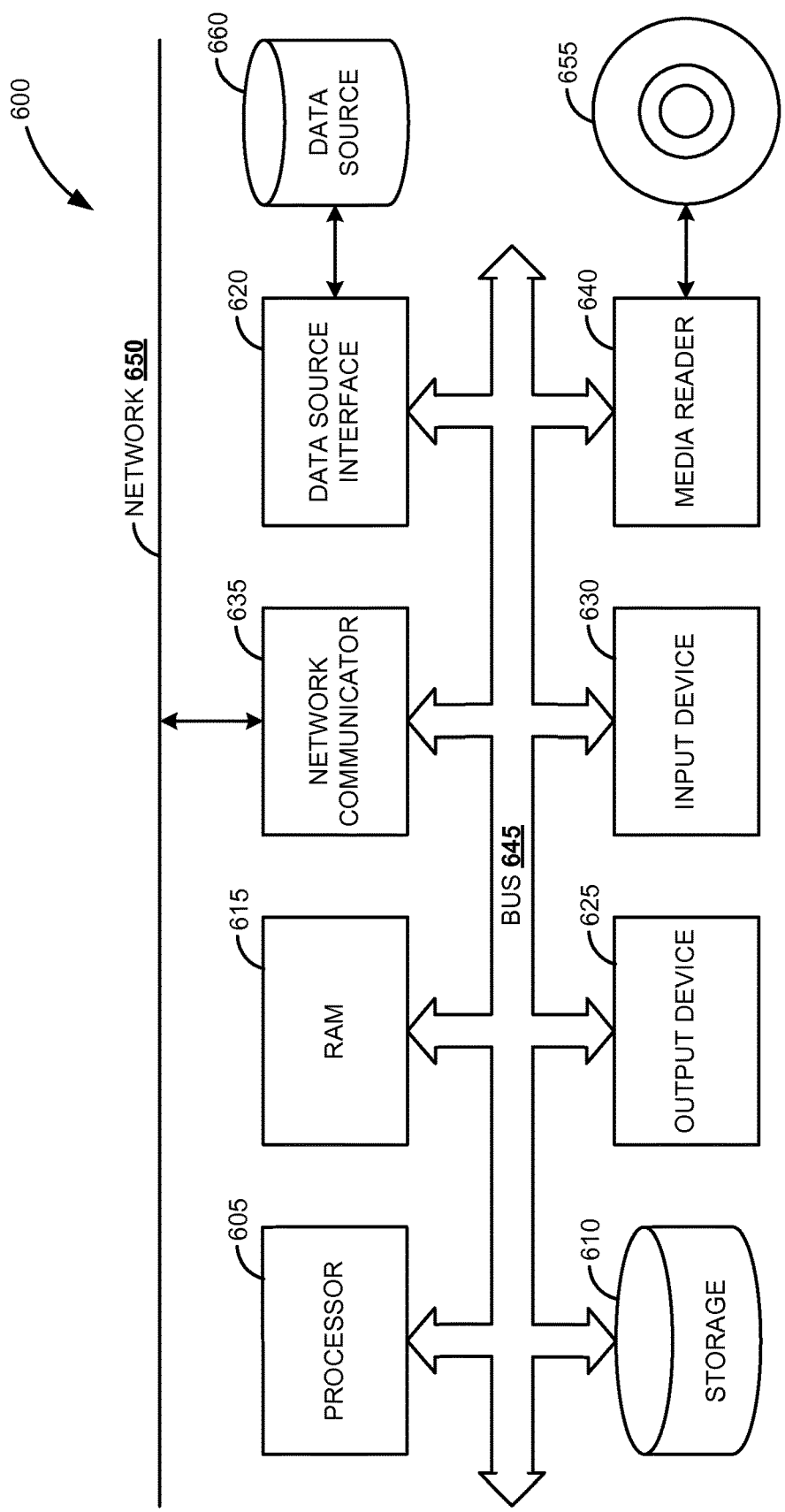
FIG. 6 is a block diagram of an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in RAM 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., enterprise resource planning (ERP) system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to perform operations comprising:
    assign a unique identifier to a node of an abstract data model (ADM);
    assign unique identifiers to one or more elements and one more actions associated with the node of the ADM;
    map the one or more elements and the one or more actions to one or more user interface (UI) elements and one or more UI actions of an application UI using the assigned unique identifiers;
    derive a service definition from the one or more UI elements and the one or more UI actions based on an input received during interaction with the application UI, wherein the service definition includes one or more definitions of type of service including a uniform resource locator associated with the application UI;
    generate a consumer-specific application programming interface (API), independent of a UI model, based on the derived service definition; and
    accept a change to the node of the ADM based on a change in a business object, of one more business objects, associated with the node upon determining that properties associated with the unique identifier of the node are compatible with the received change in the business object.

2. The non-transitory computer-readable medium of claim 1, wherein the ADM comprises a number of nodes including a root node and one or more child nodes corresponding to business data associated with the one or more business objects.

3. The non-transitory computer-readable medium of claim 1, wherein the service definition is derived at the application UI to generate a service for accepting given input parameters and to return a desired output.

4. The non-transitory computer-readable medium of claim 3, wherein the service definition comprises at least one of input and output parameters, input and output conversions, read-only services and update services, single processing and set processing actions and navigations.

5. The non-transitory computer-readable medium of claim 3, wherein the service definition comprises a data format and a communication channel.

6. The non-transitory computer-readable medium of claim 3, wherein the service definition comprises consumer-side validations and transformations.

7. The non-transitory computer-readable medium of claim 1, further comprising instructions, which when executed cause the computer system to:
    trigger an approval process to a consumer by providing relevant information of the change in the business object when the properties are incompatible.

8. A computer implemented method to generate consumer-oriented application programming interfaces (APIs) from a UI model, the method comprising:
    assigning a unique identifier to a node of an abstract data model (ADM);
    assigning unique identifiers to one or more elements and one more actions associated with the node of the ADM;
    mapping the one or more elements and the one or more actions to one or more user interface (UI) elements and one or more UI actions of an application UI using the assigned unique identifiers;
    deriving a service definition from the one or more UI elements and the one or more UI actions based on an input received during interaction with the application UI, wherein the service definition includes one or more definitions of type of service including a uniform resource locator associated with the application UI;
    generating the consumer-specific application programming interface (API), independent of the UI model, based on the derived service definition; and
    accepting a change to the node of the ADM based on a change in a business object, of one or more business objects, associated with the node upon determining that properties associated with the unique identifier of the node are compatible with the received change in the business object.

9. The computer implemented method of claim 8, wherein the ADM comprises a number of nodes including a root node and one or more child nodes corresponding to business data associated with the one or more business objects.

10. The computer implemented method of claim 8, wherein the service definition is derived at the application UI to generate a service for accepting given input parameters and to return a desired output.

11. The computer implemented method of claim 10, wherein the service definition comprises at least one of input and output parameters, input and output conversions, read-only services and update services, single processing and set processing actions and navigations.

12. The computer implemented method of claim 10, wherein the service definition comprises a data format and a communication channel.

13. The computer implemented method of claim 10, wherein the service definition comprises consumer-side validations and transformations.

14. The computer implemented method of claim 8, further comprising:
triggering an approval process to a consumer by providing relevant information of the change in the business object when the properties are incompatible.

15. A computer system to generate consumer-oriented application programming interfaces (APIs) from a UI model, the computer system comprising:
at least one processor; and
one or more memory devices communicative with the at least one processor, wherein the one or more memory devices store instructions to:
assign a unique identifier to a node of an abstract data model (ADM);
assign unique identifiers to one or more elements and one more actions associated with the node of the ADM;
map the one or more elements and the one or more actions to one or more user interface (UI) elements and one or more UI actions of an application UI using the assigned unique identifiers;
derive a service definition from the one or more UI elements and the one or more UI actions based on an input received during interaction with the application UI, wherein the service definition includes one or more definitions of type of service including a uniform resource locator associated with the application UI;
generate the consumer-specific application programming interface (API), independent of the UI model, based on the derived service definition; and
accept a change to the node of the ADM based on a change in a business object, of one or more business objects, associated with the node upon determining that properties associated with the unique identifier of the node are compatible with the received change in the business object.

16. The computer system of claim 15, wherein the ADM comprises a number of nodes including a root node and one or more child nodes corresponding to business data associated with the one or more business objects.

17. The computer system of claim 15, wherein the service definition is derived at the application UI to generate a service for accepting given input parameters and to return a desired output.

18. The computer system of claim 17, wherein the service definition comprises at least one of input and output parameters, input and output conversions, read-only services and update services, single processing and set processing actions and navigations.

19. The computer system of claim 17, wherein the service definition comprises a data format and a communication channel.

20. The computer system of claim 15, further comprising:
triggering an approval process to a consumer by providing relevant information of the change in the business object when the properties are incompatible.

* * * * *